Patented Dec. 26, 1950

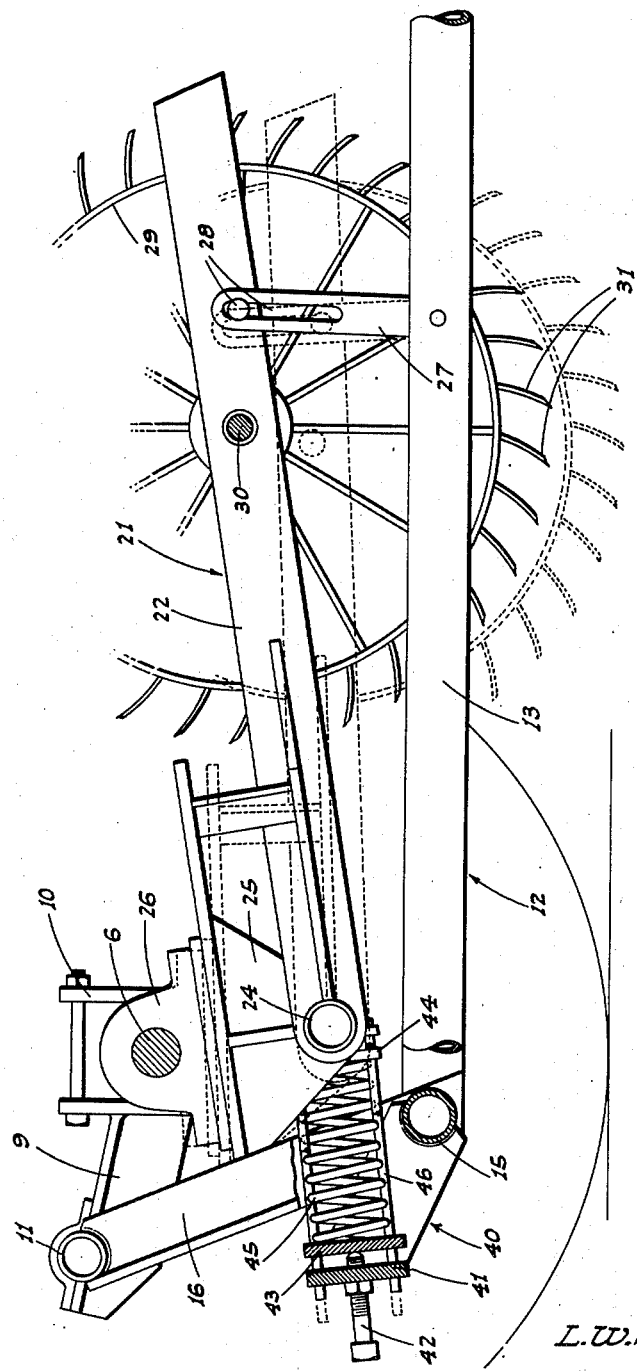

2,535,960

UNITED STATES PATENT OFFICE 2,535,960

TRACTOR-MOUNTED BEET HARVESTER

Lewis W. Schmidt, Rio Vista, Calif., assignor of twenty-one and one-fourth per cent to Claude A. Loucks, thirty-six and one-fourth per cent to Lloyd K. Schmidt, twenty-one and one-fourth per cent to Albert M. Jongeneel, and twenty-one and one-fourth per cent to Harriet Guernsey du Bose executrix of George P. du Bose, deceased Application September 8, 1947, Serial No. 772,798

13 Claims. (Cl. 55—106)

This invention relates to sugar beet harvesters.

One object of this invention is to provide a beet harvester adapted to be mounted on, and operatively carried by, a wheel-type farm tractor; the implement being disposed laterally of one side of the tractor and mainly ahead of the rear axle of said tractor.

Another object of the invention is to provide a beet harvester, as above, which is arranged so that it may be mounted on a conventional wheel-type farm tractor without any substantial modification or reconstruction thereof.

An additional object of the invention is to provide a beet harvester, for tractor mounting, which includes a novel frame assembly connected to the rear axle structure of the tractor; such frame assembly extending lengthwise ahead of the axle structure and including a vertically adjustable main frame and a floating secondary frame associated with the main frame and carrying a spiked, beet pick-up wheel.

Another object of the invention is to provide a frame assembly, as in the preceding paragraph, wherein the secondary frame normally floats, against an adjustable counterbalancing spring, to permit the spiked, beet pick-up wheel to easily follow ground contour; raising of the main frame causing like motion of the secondary frame but only after take-up of a lost-motion connection between said frames which normally allows of such floating of said secondary frame.

It is also an object to provide a tractor-mounted beet harvester which comprises, in frame-supported relation, a spiked, beet pick-up wheel, a power actuated topping unit, a top stripping unit, and a conveyor system, in novel assembly.

A still further object is the provision of a novel topping unit and receiving conveyor assembly.

A further object of the invention is to provide a practical and convenient beet harvester which will be exceedingly effective for the purpose for which it is designed.

These objects are accomplished by means of such structure and relative arrangement of parts as will fully appear by a perusal of the following specification and claims.

Fig. 5 is an enlarged fragmentary sectional elevation showing particularly the lost-motion connection between the main frame and secondary frame, and the counterbalancing spring arrangement for the latter, said figure being taken on a line 5—5 of Fig. 3.

Fig. 6 is a fragmentary plan view of the topping unit and conveyor assembly.

Figure 1:
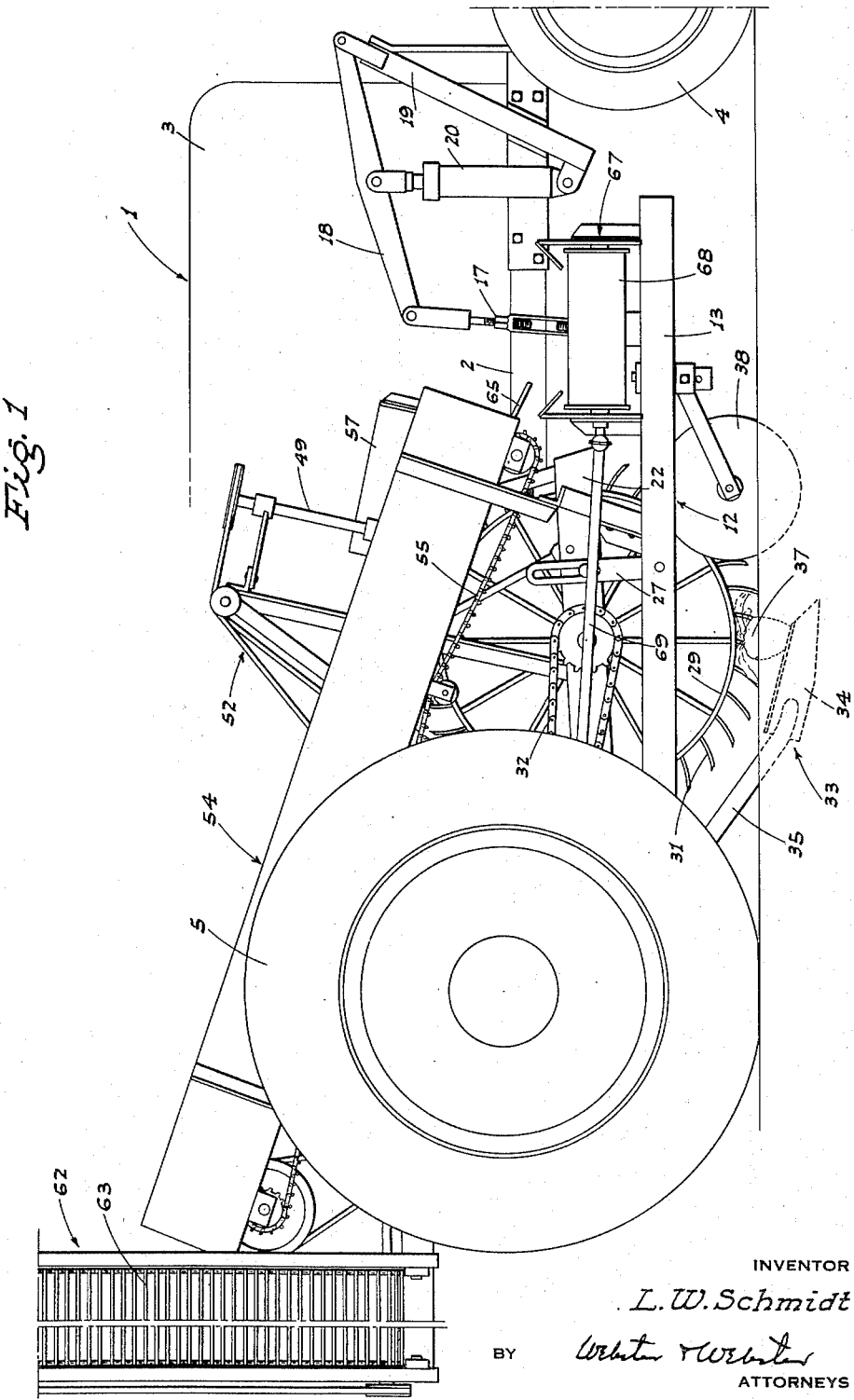
Fig. 1 is a side elevation of the tractor-mounted beet harvester in lowered, working position.

Referring now more particularly to the characters of reference on the drawings, the beet harvester is here shown as mounted in connection with a wheel-type farm tractor, indicated generally at 1, which tractor includes a main frame 2, a hood 3 enclosing the engine, transversely spaced front wheels 4, and relatively widely transversely spaced rear wheels 5. The rear wheels 5 are carried on opposite ends of an axle 6 supported on opposite sides of the tractor gear box 7 in laterally outwardly extending rear axle housings 8 on said gear box.

Rigid brackets 9 project rearwardly from clamps 10 secured to the rear axle housings 8, and said brackets turnably support a cross shaft 11 which is elongated laterally in one direction; i. e. on one side of the tractor.

An elongated main frame 12 extends along such side of the tractor mainly ahead of, and in a plane below, the tractor axle 6. The main frame 12 comprises transversely spaced, longitudinally extending side beams 13 connected together adjacent the front end by a cross beam 14, and connected at the rear end by a cross beam 15. The rear end of the main frame 12 extends slightly to the rear of the axle 6, and is there provided with a pair of transversely spaced rigid suspension arms 16 which extend upwardly at a slight rearward incline; said arms being affixed, at their upper ends, to the cross shaft 11. In this manner the main frame 12 is supported at its rear end from the tractor, yet is vertically swingably adjustable.

Figure 4:
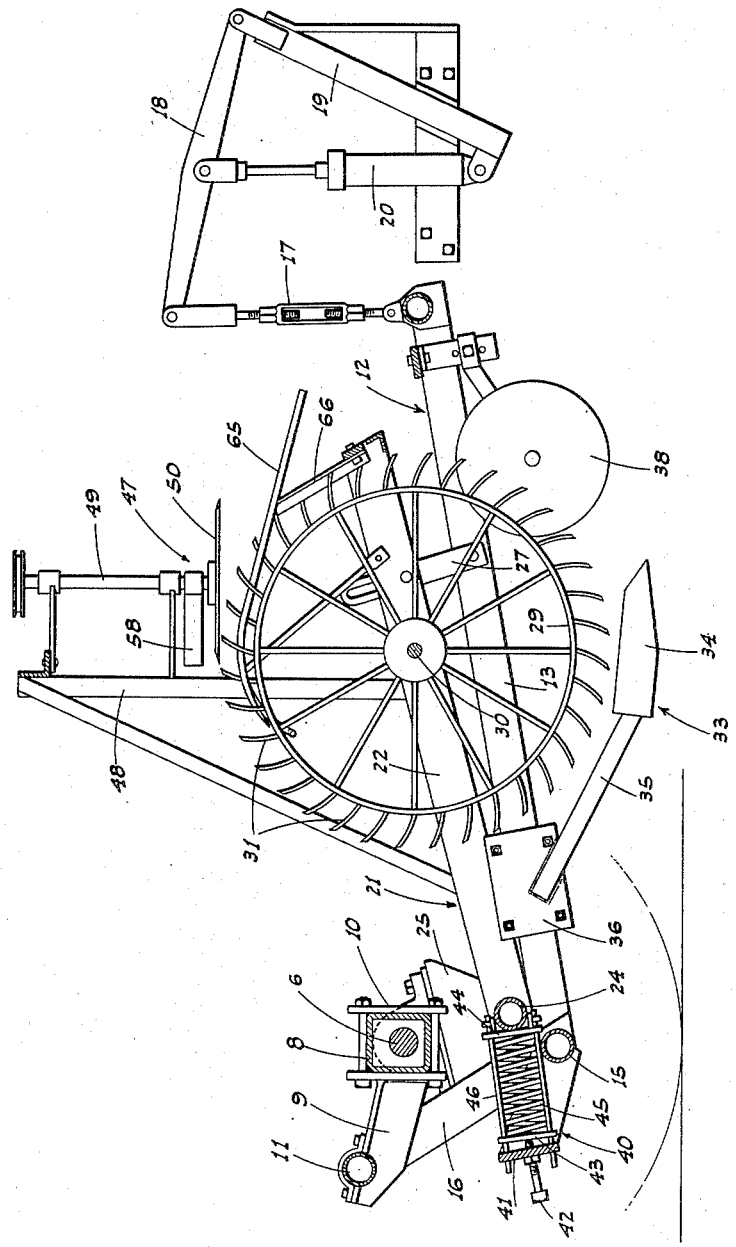
Fig. 4 is a fragmentary sectional elevation of the beet harvester in raised, transport position, taken on a line 4—4 of Fig. 3.

At its front end the main frame 12 is supported by an adjustable suspension link 17 pivotally connected between said main frame and one end of a swing lever 18 mounted in connection with a standard 19 on the tractor frame 2. An upstanding fluid actuated power cylinder 20 connects with the swing lever 18 intermediate its ends in operative relation to the latter whereby to adjust said main frame 12 between its lowered, working position, as in Figs. 1 and 2, to its raised, transport position, as in Fig. 4. The power cylinder 20 is interposed in a fluid pressure control system (not shown) which includes a valve accessible to the tractor operator.

An elongated secondary frame, indicated generally at 21, extends lengthwise above the main frame 12, terminating at its forward end short of the corresponding end of said main frame, as shown. The secondary frame 21 includes side beams 22 connected together, at their forward ends, by a cross beam 23. At its rear end the secondary frame includes a cross beam 24, to which the side beams 22 are fixedly secured; the cross beam 24 being of a length such that it extends substantially the full length of the axle 6. Adjacent its ends the cross beam 24 is fitted, on opposite sides of the gear box 7 and rear axle housings 8, with upstanding suspension plates 25 carrying bearings 26 mounted on the axle 6. With this arrangement the elongated secondary frame 21 is normally capable of vertical floating motion independently of the vertically adjusted position of the main frame 1. Posts 27 upstand from the side beams 13 of the main frame, and there is a pin and slot lost-motion connection 28 between each post 27 and the corresponding side beam 22 of the secondary frame 21. Thus, although the secondary frame is normally capable of floating motion, it is responsive to, and raises with, the main frame 12, after take-up of such lost-motion connections, so that both frames can be shifted upwardly by the power cylinder 20 to a raised, transport position.

A spiked, beet pick-up wheel 29 is journaled on an axle 30 carried in the secondary frame 21; such wheel including a plurality of circumferential, transversely spaced rows of beet pick-up spikes 31 projecting outwardly from the relatively wide flat face of said wheel; said spikes inclining in the direction of rotation, and the direction of rotation of said wheel, at the bottom, being the same as the direction of travel of the implement.

The spiked, beet pick-up wheel 29 is driven from the axle 6 by means of an endless chain and sprocket unit, indicated generally at 32.

A sub-soil plow unit, indicated generally at 33, works below the spiked, beet pick-up wheel, and comprises a pair of transversely spaced plow blades 34 carried on standards 35 secured to corresponding side beams 13 by attachment plates 36.

Figure 2:
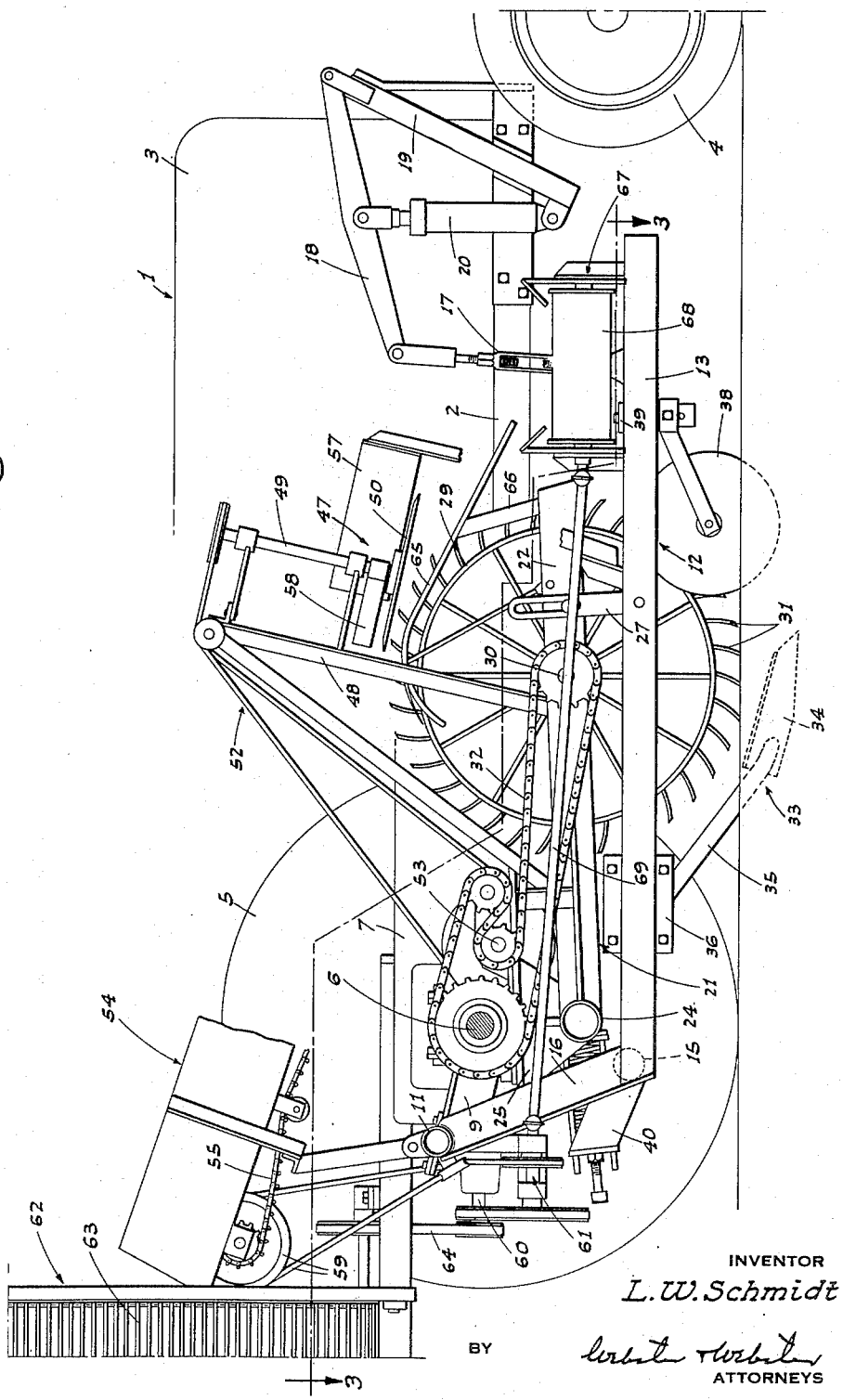
Fig. 2 is a similar view, but with the near rear wheel of the tractor removed and a portion of the longitudinal conveyor broken away.
Figure 3:
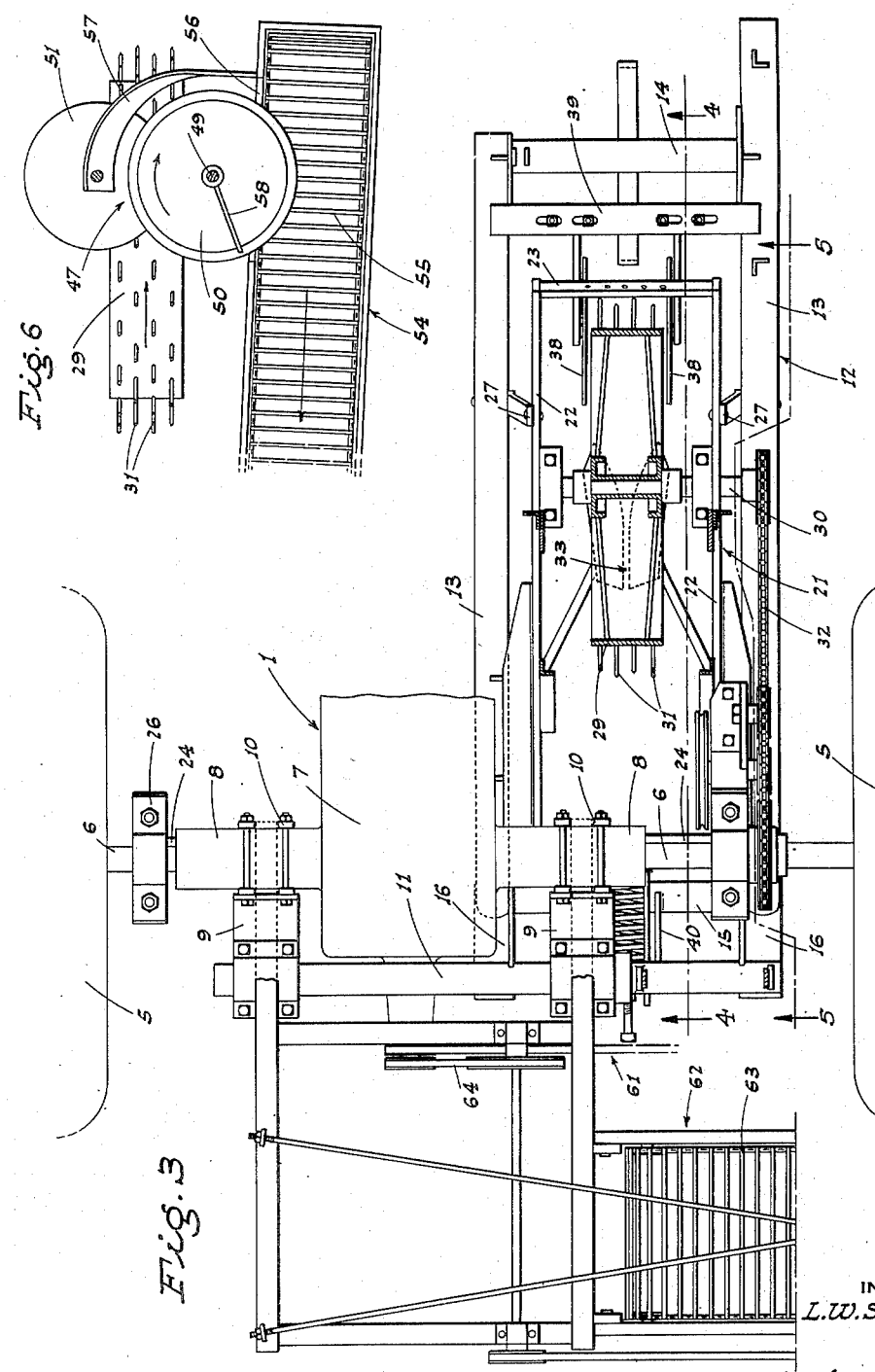
Fig. 3 is a sectional plan view of the beet harvester as mounted on a tractor, taken on a line 3—3 of Fig. 2 and with certain parts omitted.

As the implement advances with the tractor, the sub-soil plow unit 33 works below the beets 37 in the row being harvested, loosening said beets and urging them upwardly, whence they are impaled upon said spiked, beet pick-up wheel 29 in the manner shown in Fig. 1. A pair of adjustably mounted coulters 38 are mounted on the main frame to run on opposite sides of the spiked, beet pick-up wheel slightly ahead of the low point of the latter, whereby to sever excessive foliage from the beet tops and to cut entangling vines, weeds, etc. These coulters are suspended in adjustable relation from a cross bar 39.

As the implement advances, the spiked, beet pick-up wheel 29 floats easily along the beet row, following ground contour or riding over high beet crowns; this floating action being counterbalanced by the following adjustable spring arrangement:

A yoke 40 is fixed on the rear cross beam 15 of the main frame 12, and extends at an upward and rearward incline, said yoke including a cross bar 41. An adjustment bolt 42 is threaded through the cross bar 41 and bears against an end head 43 facing another end head 44 on the rear cross beam 24 of the secondary frame. A heavy-duty compression spring 45 is engaged between the end heads 43 and 44; the head 43, which is adjustable by the bolt 42, being carried on guide rods 46 which extend between said heads. With the above arrangement, the compression of the spring 45 urges the cross beam 24 of the secondary frame 21 forwardly, and as said cross beam 24 is below the axle 6 from which such secondary frame is pivotally suspended, the spring tends to swing the secondary frame upwardly; i. e. counterbalances the same so that it floats easily along the beet row. The extent of the counterbalancing action is of course varied by adjustment of the bolt 42.

Beets as impaled on the spiked, beet pick-up wheel 29 with advance of the implement, rise with said wheel to adjacent the top point thereof, whence said beets, which are then in an inverted position, are severed at the crowns by a power-actuated topping unit, indicated generally at 47. This topping unit 47 includes an upstanding post unit 48 on which a vertical spindle 49 is journaled; such spindle carrying, at its lower end, a circular rotary blade 50 disposed in cooperative or partially lapping relation to an idler blade 51. The blade 50 driven by the spindle 49, and the idler blade 51, lie symmetrical over the wheel 29 so that such blades both act on each beet passing the topping unit.

The upstanding spindle 49 is driven by an endless belt and pulley unit, indicated generally at 52, driven from a cross shaft 53 actuated from the chain of the endless chain and sprocket unit 32.

A longitudinal conveyor, indicated generally at 54, is fixedly supported in connection with the main frame 12 and extends lengthwise thereof at an upward and rearward incline from adjacent and alongside the circular rotary blade 50; said longitudinal conveyor 54 including an endless draper 55. At its forward end, and on the side adjacent the circular rotary blade 50 of the topping unit, the conveyor 54 is formed with an opening 56, and an upstanding deflector 57 is disposed ahead of said blade and merges with the forward edge of said opening. The spindle 49 directly above the circular rotary blade 50 carries a sweep 58 so that beets as topped by the topping unit 47 are swept through the opening 56 onto the lower end of the endless draper 55 of the conveyor 54. The endless draper 55 is driven by an endless belt and pulley unit, indicated generally at 59, and the latter is in turn actuated from the power take-off shaft 60 of the tractor through the medium of a countershaft drive, indicated generally at 61.

At its upper end the endless conveyor 54 discharges into a laterally and upwardly inclined elevator conveyor 62 including an endless draper 63. The elevator conveyor 62, into which the topped beets discharge from the conveyor 54, is of sufficient length and reach so that it may discharge into a truck (not shown) traveling alongside the tractor. The endless draper 63 of the conveyor 62 is driven from the power take-off shaft 60 by an endless belt and pulley unit 64. The endless drapers 55 and 63 of the conveyors 54 and 62, respectively, are foraminous, to the end that dirt, etc. may escape the topped beets and fall onto the ground prior to discharge of said beets from the conveyor 62.

After the impaled beets on the spiked, beet pick-up wheel 29 are topped by the power actuated topping unit 47, with the beets being conveyed away, as above described, the tops continue a short distance on said wheels, whence they are stripped therefrom by a plurality of transversely spaced stripping bars 65 carried on a mount 66 in such position that said bars extend between the rows of spikes 31 generally tangentially of said wheel from a point ahead thereof. The mount 66 is affixed to the forward end of the secondary frame 21, and the stripping bars 65 project forwardly from and beyond said wheel, so that the cut beet tops which said bars strip from the wheel, so that the cut beet tops which said bars strip from the wheel discharge onto a lateral conveyor 67 mounted on the main frame 12 at its forward end; the lateral conveyor 67 including an endless draper 68 which receives, conveys, and discharges the cut beet tops in a windrow to one side of the path of the spiked, beet pick-up wheel 29. The endless draper 68 is driven by a universal drive shaft 69 from the countershaft drive 61.

The above described beet harvester is so designed that it can be mounted on a conventional wheel-type farm tractor without any substantial modification of the latter. As so mounted, the beet harvester provides a practical and convenient implement for the effective and expeditious harvesting of beets; i.e. the digging and topping of the same, and the discharge thereof into a truck traveling alongside the tractor.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are concerned:

1. A beet harvester for a wheel-type tractor, comprising a frame assembly adapted to extend lengthwise along one side of the tractor, said frame assembly including a longitudinal main frame and a longitudinal secondary frame arranged in normally vertically floating relation to the main frame, and a beet digging and elevating mechanism on the frame assembly including a spiked, beet pick-up wheel journaled on the secondary frame for ground engagement; the main frame being vertically adjustable.

2. A beet harvester for a wheel-type tractor, comprising a frame assembly adapted to extend lengthwise along one side of the tractor, said frame assembly including a longitudinal main frame and a longitudinal secondary frame arranged in normally vertically floating relation to the main frame, and a beet digging and elevating mechanism on the frame assembly including a spiked, beet pick-up wheel journaled on the secondary frame for ground engagement; the main frame being vertically adjustable, and there being a lost-motion connection between the main frame and secondary frame to allow the latter to normally float yet to permit raising of said secondary frame by the main frame after take-up of the last mentioned connection.

3. A beet harvester for a wheel-type tractor, comprising a frame assembly adapted to extend lengthwise along one side of the tractor, the tractor including a laterally projecting rear axle structure, clamping means to secure the frame assembly at its rear end to said rear axle structure, a suspension link operative to suspend the frame assembly adjacent its forward end from the tractor, and a beet digging and elevating mechanism mounted on the frame assembly; the frame assembly including a main longitudinally extending, vertically adjustable frame, and a secondary longitudinally extending frame normally vertically floatable relative to the main frame but responsive to raising thereof, the beet digging and elevating mechanism including a spiked, beet pick-up wheel journaled on the secondary frame.

4. A beet harvester for a wheel-type tractor, comprising a frame assembly adapted to extend lengthwise along one side of the tractor, the tractor including a laterally projecting rear axle structure, means to secure the frame assembly at its rear end to said rear axle structure, means to suspend the frame assembly adjacent its forward end from the tractor, and a beet digging and elevating mechanism mounted on the frame assembly; the frame assembly including a main longitudinally extending, vertically adjustable frame, and a secondary longitudinally extending frame normally vertically floatable relative to the main frame but responsive to raising thereof, the beet digging and elevating mechanism including a spiked, beet pick-up wheel journaled on the secondary frame, a beet topping unit mounted on the secondary frame in cooperating relation to said wheel, and a beet top stripping unit mounted on the secondary frame in cooperating relation to said wheel beyond the topping unit, there being a lateral conveyor on the main frame in position to receive cut beet tops stripped from the wheel by said stripping unit.

5. A beet harvester for a wheel-type tractor, comprising a frame assembly adapted to extend lengthwise along one side of the tractor, said frame assembly including a longitudinal main frame and a longitudinal secondary frame, cross members on the tractor at the rear corresponding to said frames, means pivoting the frames adjacent their rear ends to corresponding cross members for vertical motion, adjustable suspension means between the forward portion of the main frame and the tractor, and beet digging and elevating mechanism mounted on the frame assembly including a spiked, beet pick-up wheel journaled on the secondary frame for ground engagement.

6. A beet harvester for a wheel-type tractor, comprising a frame assembly adapted to extend lengthwise along one side of the tractor, said frame assembly including a longitudinal main frame and a longitudinal secondary frame, cross members on the tractor at the rear corresponding to said frames, means pivoting the frames adjacent their rear ends to corresponding cross members for vertical motion, adjustable suspension means between the forward portion of the main frame and the tractor, and beet digging and elevating mechanism mounted on the frame assembly including a spiked, beet pick-up wheel journaled on the secondary frame for ground engagement; there being a lost-motion connection between said frames whereby the secondary frame normally floats in response to passage of the wheel over ground contours, but said secondary frame lifts with the main frame upon take-up of said lost-motion connection.

7. A beet harvester for a wheel-type tractor, comprising a frame assembly adapted to extend lengthwise along one side of the tractor, said frame assembly including a longitudinal main frame and a longitudinal secondary frame, cross members on the tractor at the rear corresponding to said frames, means pivoting the frames adjacent their rear ends to corresponding cross members for vertical motion, adjustable suspension means between the forward portion of the main frame and the tractor, and beet digging and elevating mechanism mounted on the frame assembly including a spiked, beet pick-up wheel journaled on the secondary frame for ground engagement; the secondary frame normally floating but being arranged to raise with the main frame, and spring means counterbalancing the floating motion of said secondary frame.

8. A beet harvester for a wheel-type tractor, comprising a frame assembly adapted to extend lengthwise along one side of the tractor, said frame assembly including a longitudinal main frame and a longitudinal secondary frame, means securing the main frame in connection with the tractor, means pivotally securing the secondary frame in connection with the tractor for normal vertical floating motion, beet digging and elevating mechanism mounted on the frame assembly, said mechanism including a spiked, beet pick-up wheel journaled on the secondary frame for ground engagement, and spring means counterbalancing the floating motion of said secondary frame.

9. A beet harvester for a wheel-type tractor, comprising a frame assembly adapted to extend lengthwise along one side of the tractor, said frame assembly including a longitudinal main frame and a longitudinal secondary frame, means securing the main frame in connection with the tractor, means pivotally securing the secondary frame in connection with the tractor for normal vertical floating motion, beet digging and elevating mechanism mounted on the frame assembly, said mechanism including a spiked, beet pick-up wheel journaled on the secondary frame for ground engagement, and spring means counterbalancing the floating motion of said secondary frame; the mounting means for said frames including corresponding cross members on the frame, each frame including an upwardly projecting rear portion pivotally suspended from the corresponding cross member, and said spring means including a compression spring mounted between said frames below said cross members.

10. A beet harvester for a wheel-type tractor, comprising a frame assembly adapted to extend lengthwise along one side of the tractor, said frame assembly including a longitudinal main frame and a longitudinal secondary frame, means pivotally securing said frames adjacent the rear end to the tractor for vertical motion, adjustable suspension means between the forward portion of the main frame and the tractor, a spiked, beet pick-up wheel journaled on the secondary frame for ground engagement, a sub-soil plow unit mounted on the frame assembly and working below said wheel, a beet topping unit mounted on the secondary frame and cooperating with the wheel adjacent the top thereof, a conveyor supported from the frame assembly in position to receive topped beets from the topping unit, a top stripping unit cooperating with the wheel adjacent the topping unit, and another conveyor supported from the frame assembly in position to receive beet tops stripped from said wheel.

11. A beet harvester for a wheel-type tractor, comprising a frame assembly adapted to extend lengthwise along one side of the tractor, said frame assembly including a longitudinal main frame and a longitudinal secondary frame, means pivotally securing said frames adjacent the rear end to the tractor for vertical motion, adjustable suspension means between the forward portion of the main frame and the tractor, a spiked, beet pick-up wheel journaled on the secondary frame for ground engagement, a sub-soil plow unit mounted on the frame assembly and working below said wheel, a beet topping unit mounted on the secondary frame and cooperating with the wheel adjacent the top thereof, a conveyor supported from the frame assembly in position to receive topped beets from the topping unit, a top stripping unit cooperating with the wheel adjacent the topping unit, and another conveyor supported from the frame assembly in position to receive beet tops stripped from said wheel; there being a laterally disposed elevator conveyor mounted on and projecting from the tractor adjacent its rear end, said first named conveyor extending lengthwise and delivering to said elevator conveyor.

12. A beet harvester for a wheel-type tractor, comprising a frame assembly adapted to extend lengthwise along one side of the tractor, said frame assembly including a longitudinal main frame and a longitudinal secondary frame, means pivotally securing said frames adjacent the rear end to the tractor for vertical motion, adjustable suspension means between the forward portion of the main frame and the tractor, a spiked, beet pick-up wheel journaled on the secondary frame for ground engagement, a sub-soil plow unit mounted on the frame assembly and working below said wheel, a beet topping unit mounted on the secondary frame and cooperating with the wheel adjacent the top thereof, a longitudinal conveyor supported from the main frame in position to receive topped beets from said topping unit, said conveyor extending rearwardly from the latter, a lateral elevator conveyor on the tractor at the rear to which said longitudinal conveyor delivers, a top stripping unit mounted on the secondary frame and cooperating with the wheel adjacent the topping unit, and a transverse conveyor on the main frame in position to receive beet tops as stripped from the wheel.

13. In a beet harvester which includes a spiked, beet pick-up wheel, and a beet topping unit cooperating with the wheel adjacent the top thereof; the topping unit including an upstanding, driven spindle, a rotary blade fixed on the spindle and rotatable therewith, a sweep fixed on the spindle adjacent the blade and rotatable with the spindle, and a conveyor adjacent said unit in position to receive beets cut by the blade and moved by the sweep.

LEWIS W. SCHMIDT.

REFERENCES CITED

The following references are of record in the file of this patent:

UNITED STATES PATENTS

| Number | Name | Date |
| --- | --- | --- |
| Re. 15,914 | Luce | Sept. 9, 1924 |
| 1,300,362 | Faucker | Apr. 15, 1919 |
| 1,503,625 | Beale | Aug. 5, 1924 |
| 2,235,470 | Betty | Mar. 18, 1941 |
| 2,336,623 | Loucks et al. | Dec. 14, 1943 |
| 2,337,698 | Walz | Dec. 28, 1943 |
| 2,350,173 | Loucks et al. | May 30, 1944 |
| 2,428,904 | Zuckerman | Oct. 14, 1947 |